United States Patent
Meswani

(10) Patent No.: US 10,324,760 B2
(45) Date of Patent: Jun. 18, 2019

(54) LEASES FOR BLOCKS OF MEMORY IN A MULTI-LEVEL MEMORY

(71) Applicant: Advanced Micro Devices, Inc., Sunnyvale, CA (US)

(72) Inventor: Mitesh Meswani, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 76 days.

(21) Appl. No.: 15/143,032

(22) Filed: Apr. 29, 2016

(65) Prior Publication Data

US 2017/0315915 A1 Nov. 2, 2017

(51) Int. Cl.
*G06F 12/08* (2016.01)
*G06F 9/50* (2006.01)

(52) U.S. Cl.
CPC ............ *G06F 9/5016* (2013.01); *Y02D 10/22* (2018.01)

(58) Field of Classification Search
CPC ............. G06F 12/0808; G06F 12/0811; G06F 12/0871; G06F 2212/604; G06F 2212/62; G06F 9/5016

USPC .......... 711/118, 133, 170, 171; 71/118, 133, 71/170, 171
See application file for complete search history.

(56) References Cited

U.S. PATENT DOCUMENTS

| | | | |
|---|---|---|---|
| 8,219,762 B1* | 7/2012 | Shavit | G06F 12/0815 711/100 |
| 9,058,897 B2* | 6/2015 | Yu | |
| 2014/0052946 A1* | 2/2014 | Kimmel | G06F 12/02 711/159 |

\* cited by examiner

*Primary Examiner* — Gary J Portka
(74) *Attorney, Agent, or Firm* — Park, Vaughan, Fleming & Dowler LLP

(57) ABSTRACT

The described embodiments include a computing device that has two or more levels of memory, each level of memory having different performance characteristics. During operation, the computing device receives a request to lease an available block of memory in a specified level of memory for storing an object. When a block of memory is available for leasing in the specified level of memory, the computing device stores the object in the block of memory in the specified level of memory. The computing device also commences the lease for the block of memory by setting an indicator for the block of memory to indicate that the block of memory is leased. During the lease (i.e., until the lease is terminated), the object is kept in the block of memory.

18 Claims, 4 Drawing Sheets

LEASES FOR BLOCKS OF MEMORY IN A MULTI-LEVEL MEMORY

BACKGROUND

Field

The described embodiments relate to computing devices having memory hierarchies with multiple levels of memory or "multi-level memory hierarchies." More specifically, the described embodiments relate to techniques for leasing blocks of memory in multi-level memory hierarchies.

Related Art

Some computing devices include two or more levels of memory organized in a multi-level memory hierarchy. In some of these computing devices, some or all of the levels of the multi-level memory hierarchy are implemented using different types of memory (i.e., memory circuits having different architectures, circuit structures, organization, etc.). For example, multi-level memory hierarchies may include some or all of dynamic random access memory (DRAM) or die-stacked DRAM, phase-change memory (PCM), non-volatile memory such as flash, etc. Each type of memory is associated with various characteristics, benefits, and limitations. For example, some types of memory, such as DRAM, enable faster memory accesses, but consume more electrical power, are more expensive, produce more heat, etc. As another example, some types of memory, such as flash memory, are cheaper and more scalable, but are slower to access.

In some cases, objects (data, instructions, etc.) may be stored in levels of multi-level memory hierarchies for which the corresponding type of memory is less than optimal for storing the object. For example, an object that is accessed often may be stored in a slower type of memory—thereby requiring more time for accesses than if the object was stored in a faster type of memory. As another example, an object that takes up a larger amount of space may be stored in a lower-capacity and expensive high-speed type of memory, instead of being stored in a slower, but higher-capacity and cheaper type of memory. Because efficient operation of memory is an important aspect of the overall operation of computing devices, the storage of objects in multi-level memory hierarchies that include different types of memories is a concern.

BRIEF DESCRIPTION OF THE FIGURES

In the figures, like reference numerals refer to the same figure elements.

DETAILED DESCRIPTION

Figure 1:
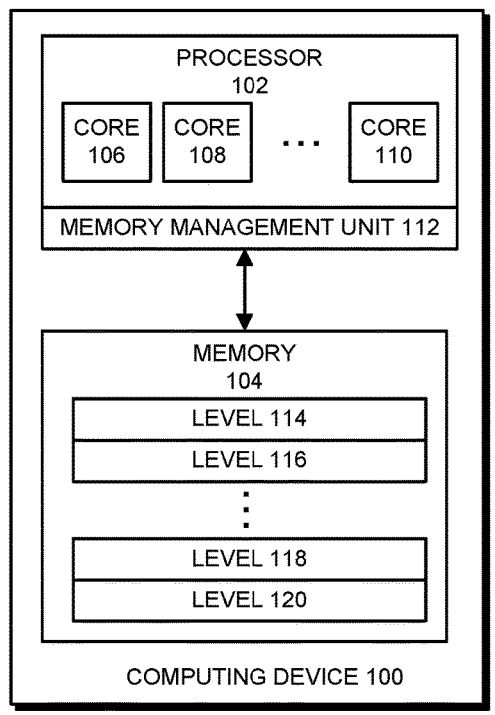
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Overview

The described embodiments manage the storage of objects in a multi-level memory hierarchy in a computing device. In these embodiments, "objects" include data, instructions, etc. that are stored in the multi-level memory hierarchy and accessed by hardware entities (e.g., controllers, processors, etc.) and/or software entities (e.g., application programs, operating systems, etc.). The multi-level memory hierarchy includes a number of "levels," with two or more of the levels including different types of memory with different characteristics, benefits, and/or limitations (e.g., access times, power usage, storage size, monetary cost, implementation complexity, etc.). For example, the multi-level memory hierarchy can include two or more of DRAM, stacked DRAM, phase-change memory (PCM), flash memory, etc. arranged in two or more levels. The described embodiments are configured to lease blocks of memory in levels of the multi-level memory hierarchy for storing objects. Generally, an object, when stored in a leased block of memory, is kept in the block of memory until the lease is terminated.

In some embodiments, in order to establish a lease for a block of memory, a software or hardware entity sends, to a runtime in the computing device, a request to lease a block of memory in a specified level of the multi-level memory hierarchy for storing an identified object. For example, the software entity can request to lease a block of memory for storing one or more pages of data (e.g., 4 KB, 8 KB, etc. pages) in a specified level of the multi-level memory hierarchy. The runtime determines that at least one block of memory in the specified level has not presently been leased and is therefore available for lease. The runtime then commences a lease for one of the available blocks of memory. For example, the runtime can update a lease indicator in one or more hardware records (e.g., a register) or software records (e.g., an entries in a page table, a list, etc.) associated with the block of memory to indicate that the block of memory has been leased. The runtime stores the object in the leased block of memory. As described above, until the lease is terminated, the object is kept in the block of memory (i.e., retained in the leased block of memory in accordance with a retention policy as described in more detail below).

In some embodiments, in order to terminate the above-described lease, a software or hardware entity sends, to the runtime, a request to terminate the lease for the block of memory. The runtime then terminates the lease for the block of memory. For example, the runtime can update a lease indicator in the one or more hardware records or software records associated with the block of memory to indicate that no lease is presently held for the block of memory. When the lease has been terminated, the object is no longer kept in the block of memory. For example, the object can be immediately evicted from the block of memory, retained in the block of memory but not protected from subsequent eviction, etc.

In some embodiments, differently than the example above, after receiving the request to lease a block of memory in the specified level of the multi-level memory hierarchy, the runtime determines that no blocks of memory are available for lease in the specified level (e.g., all leasable blocks of memory have already been leased) and/or that no blocks of memory of a size sufficient to store the identified object (e.g., in terms of bytes) are available for lease in the specified level. In these cases, the runtime can perform one or more remedial or corrective operations. For example, the runtime can send a rejection of the request to the software or hardware entity, can wait for a specified time (e.g., N milliseconds) and retry acquiring the lease, can lease a smaller portion of memory (smaller than the block of memory) and use the leased smaller portion in a similar way as described above for the leased block of memory, etc.

In some embodiments, a software or hardware entity sends, to a runtime in the computing device, a lease hint that includes information about a future lease that may be requested for a block of memory in a specified level of the multi-level memory hierarchy for storing an identified object. In these embodiments, the runtime may use the hint to perform various operations, such as prefetching the object to the specified level, holding or reserving a block of memory for lease (e.g., preventing other leases from being started for the held/reserved block of memory), scheduling an eviction of another/existing object from a block of memory in the specified level to make room for the object, etc.

By enabling hardware and software entities to lease blocks of memory as described above, the described embodiments enable the hardware and software entities to control, at least to some extent, a level of memory in which objects are stored. This control can be used by the hardware and software entities to store objects in levels of the memory that are more appropriate for the objects. For example, an object that is accessed often may be stored in a faster type of memory, a larger object may be stored in a slower, but higher-capacity and cheaper type of memory, etc. This can enable the hardware and software entities and/or the memory to operate more efficiently (e.g., in terms of memory access time, bus bandwidth demands, memory capacity/space usage, power consumption, etc.), which can improve the overall operating efficiency of the computing device.

Computing Device

FIG. 1 presents a block diagram illustrating a computing device 100 in accordance with some embodiments. As can be seen in FIG. 1, computing device 100 includes processor 102 and memory 104. Processor 102 is a functional block that performs computational operations for computing device 100. Processor 102 includes cores 106-110, each of which is a functional block that performs computational operations. For example, each of cores 106-110 may include one or more of a central processing unit (CPU) such as a microprocessor, a graphics processing unit (GPU), an embedded processor, an application-specific integrated circuit (ASIC), etc.

Memory 104 is a functional block that stores data and instructions for other functional blocks in computing device 100. Memory 104 includes memory circuits such DRAM, double data rate (DDR) synchronous dynamic random access memory (SDRAM), PCM, die-stacked DRAM, non-volatile memory (flash, etc.), and/or other types of memory circuits, as well as control circuits for handling accesses of the instructions and data that are stored in the memory circuits. In some embodiments, memory 104 is a main memory in computing device 100. As described in more detail below, memory 104 includes a multi-level memory hierarchy in which blocks of memory can be leased.

Processor 102 includes memory management unit 112. Memory management unit 112 is a functional block that performs operations for handling interactions between processor 102 and memory 104. For example, memory management unit 112 can handle reading data from and writing data to memory 104, control and configure memory circuits in memory 104, handle virtual address to physical address translation, perform operations associated with leasing blocks of memory in the multi-level memory hierarchy, etc.

In some embodiments, one or more communication paths (e.g., buses, wires, and/or other signal routes) are coupled between processor 102 and memory 104, as shown by an arrow-headed line between processor 102 and memory 104. The one or more communication paths are used to transmit commands, data, and/or other information between processor 102 and memory 104. In some embodiments, the communication paths include controllers, processors, adapters, and/or other circuits for handling communications on the communication paths.

Although computing device 100 is described with a particular arrangement of functional blocks, some embodiments include a different number and/or arrangement of functional blocks. For example, some embodiments have multiple processors 102 and/or a different number of cores (as shown by the ellipsis in FIG. 1). Generally, in the described embodiments, computing device 100 can include any number or arrangement of functional blocks that perform the operations herein described.

Computing device 100 is simplified for illustrative purposes. In some embodiments, computing device 100 includes additional and/or different functional blocks or elements for performing the operations herein described and/or other operations. For example, computing device 100 may include mass storage devices (disks, large non-volatile semiconductor memories, etc.), power subsystems (AC power, batteries, etc.), media processing subsystems, networking subsystems, display subsystems, heating/cooling subsystems, internal communication subsystems (e.g., a northbridge, a southbridge, etc.), peripheral devices, I/O devices, etc.

Computing device 100 can be, or can be included in, any type of electronic device. For example, computing device 100 can be, or can be included in, electronic devices such as desktop computers, laptop computers, wearable computing devices, tablet computers, smart phones, servers, network appliances, toys, audio-visual equipment (stereo receivers, televisions, projectors, set top boxes, etc.), home appliances, vehicles (autos, trucks, airplanes, etc.), industrial controllers, and/or other electronic devices.

Figure 2:
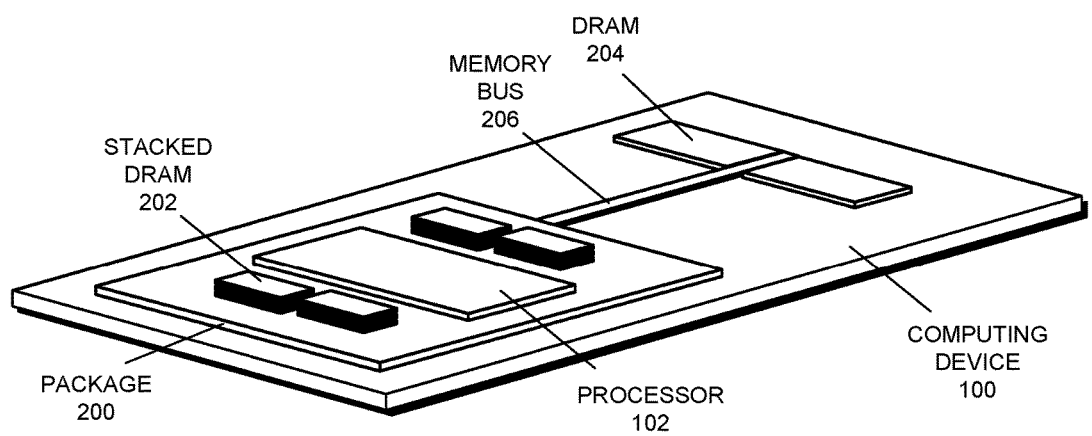
FIG. 2 presents an isometric view of a computing device in accordance with some embodiments.

FIG. 2 presents an isometric view of computing device 100 in accordance with some embodiments. As can be seen in FIG. 2, computing device 100 includes a package 200 on which a processor 102 integrated circuit chip and four stacked DRAM modules are mounted or otherwise coupled (one of which is labeled stacked DRAM 202). Package 200 includes a chip package, a semiconductor interposer, etc. which may have communication routes (wires, guides, etc.) and/or circuitry via which the processor and the stacked DRAM modules communicate with one another and external devices. Computing device 100 also includes, external to package 200, a memory bus 206 and two DRAM modules (one of which is labeled DRAM 204). Each of the four stacked DRAM modules mounted on package 200 includes a number of DRAM integrated circuit chips (i.e., having DRAM memory circuits, etc. fabricated thereon) that are arranged in a stack and communicatively coupled to each other and/or the processor via through silicon vias (TSVs), inductive and/or capacitive communication, etc. The DRAM modules external to package 200 each include one or more DRAM integrated circuit chips.

In some embodiments, the stacked DRAM modules mounted on package 200 and the DRAM modules external to package 200 are included in one of two levels of a multi-level memory hierarchy. For example, the stacked DRAM modules may be included in one level of the multi-level memory hierarchy, and the DRAM modules may be included in another level of the multi-level memory hierarchy. As described below, the levels with which the stacked DRAM/DRAM modules are included may be designated in consideration of access time and size as, in some embodiments, the stacked DRAM modules may be smaller in capacity but faster for processor 102 to access then the DRAM modules external to package 200.

Although a particular arrangement of elements is illustrated in computing device 100 in FIG. 2, in some embodiments, different elements may be present. For example, in some embodiments, some or all of the processor and the stacked DRAM modules mounted on package 200 are enclosed in package 200. As another example, another number or arrangement of DRAM modules may be used. Generally, the described embodiments can use any number or arrangement of elements that perform the operations herein described.

Multi-Level Memory Hierarchy

As described above, memory 104 includes a multi-level memory hierarchy with a number of levels, such as levels 114-120 in FIG. 1. Within the multi-level memory hierarchy, two or more of the levels include memory with different performance characteristics (e.g., access speeds, memory circuit types, capacity, etc.). For example, levels 114-120 may include stacked DRAM, DRAM, PCM, flash, and/or another type of volatile or non-volatile memory. In some embodiments, particular memory elements (or functional blocks, integrated circuit chips, etc.) are included in corresponding levels based on the performance characteristics. For example, a stacked DRAM module in computing device 100 may be included in level 114 due to faster access and higher bandwidth but limited storage capacity, and a flash memory may be included in level 116 due to slower access but larger storage capacity.

In some embodiments, memory 104 is addressed using a single address space, independently of the particular memory elements in each level and/or the number of levels. For example, a first portion of a set of addresses in the address space may be directed to (or otherwise associated with) memory elements in level 114, a second portion of the set of address directed to (or otherwise associated with) memory elements in level 116, etc. In these embodiments, computing device 100 includes one or more controllers (e.g., memory management unit 112, etc.), circuits, etc. for directing memory accesses (reads, writes, etc.) to the corresponding level of the multi-level memory hierarchy based on the associated addresses and other considerations—such as the leases described herein.

In some embodiments, memory 104 is arranged as a non-uniform memory access (NUMA) design, in which multiple portions of the available memory are associated with and therefore local to different processors (e.g., processor 102) and/or processor cores 106-110 in computing device 100. For example, in some embodiments, two or more processors are mounted in sockets with corresponding memory circuits (e.g., discrete memory chips, on-die memory circuits, etc.) being local to each processor, and with the memory circuits in other sockets being remote to each processor. In these embodiments, a processor may access local memory circuits faster than remote memory circuits. In some embodiments with a NUMA design, memory elements (circuits, chips, etc.) are included in levels of the multi-level memory hierarchy based at least in part on the locality of the memory to one or more processors.

In some embodiments, the type of memory in which each of the levels multi-level memory hierarchy is implemented depends on projected workload or performance demands, cost and availability of memory devices/functional blocks, etc. For example, in some embodiments, a number of high-speed, high-bandwidth levels maybe increased (e.g., from one to two or more of levels 114-120) when system workload or performance demands warrant the increased cost, power consumption, etc.

Although the multi-level memory hierarchy is described using levels 114-120 and particular types of memory, in some embodiments, different numbers and/or arrangements of levels may be used (as shown by the ellipsis in FIG. 1). In addition, the described embodiments may be implemented using other types of memory. Generally, the described embodiments may use any number of levels and/or type of memory for which the operations herein described may be performed.

Leasing Blocks of Memory

As described above, the described embodiments lease blocks of memory for storing objects in a multi-level memory hierarchy. As used herein, "object" includes any block, section, etc. of data and/or instructions of any size that can be stored in a memory and accessed, from a single byte to a multi-byte chunk. Objects may be, or include, data and/or instructions that are generated and/or used by either of hardware entities and/or software entities in computing device 100. In some embodiments, objects include one or more pages (and possibly a range of pages) of data of a specified size (e.g., 4 KB, 8 KB, etc.), such as pages of data that are loaded from a mass storage device (e.g., a disk drive or large non-volatile semiconductor memory) (not shown) to memory 104, pages of data generated by a hardware and/or software entity, etc.

As used herein, a "block" of memory includes any region, portion, etc. of memory in which at least one object can be stored and which can be leased as described herein. For example, a block of memory may include one or more bytes (and possibly many bytes) at one or more contiguous or non-contiguous (i.e., scattered) addressable locations (i.e., memory locations that can be separately accessed using corresponding addresses). In some embodiments, leased blocks of memory are sized so that an object fits (i.e., can be stored) within the leased block of memory. For example, assuming that the object is a 4 KB page of data, a 4 KB block of memory may be leased to store the object. As another example, an N-byte block of memory may be leased to store an M-byte object, where N is equal to or greater than M (i.e., so that the leased block of memory is as big as or bigger than the object).

As used herein, to "lease" a block of memory in a specified level of memory 104 for storing an object means to configure the block of memory (i.e., the functional blocks that handle accesses to the block of memory, etc.) so that the object is "kept" in the block of memory until the lease is terminated. "Keeping" an object in a leased block of memory means to retain the object in the leased block of memory in accordance with a retention policy. For example, in some embodiments, an object in a leased block of memory is prevented from being evicted (i.e., is not a candidate for eviction to free the leased block of memory to store another object). As another example, in some embodiments, an object is only evicted from a leased block of memory when the block of memory is needed for another specified object (e.g., when the block of memory is needed for storing a higher-priority object, etc.). As yet another example, in some embodiments, an object in a leased block of memory is evicted first, last, etc. among a specified group or set of objects in blocks of memory (possibly a group or set of objects in leased blocks of memory). In some embodiments, the retention policy is separately set for two or more blocks of memory, so that different leased blocks of memory may have different retention policies. "Leasing" indicates the operation(s) that are performed to lease a block of memory. Blocks of memory are "leased" when leases have been started for the blocks of memory and remain leased until the leases are terminated.

Figure 3:
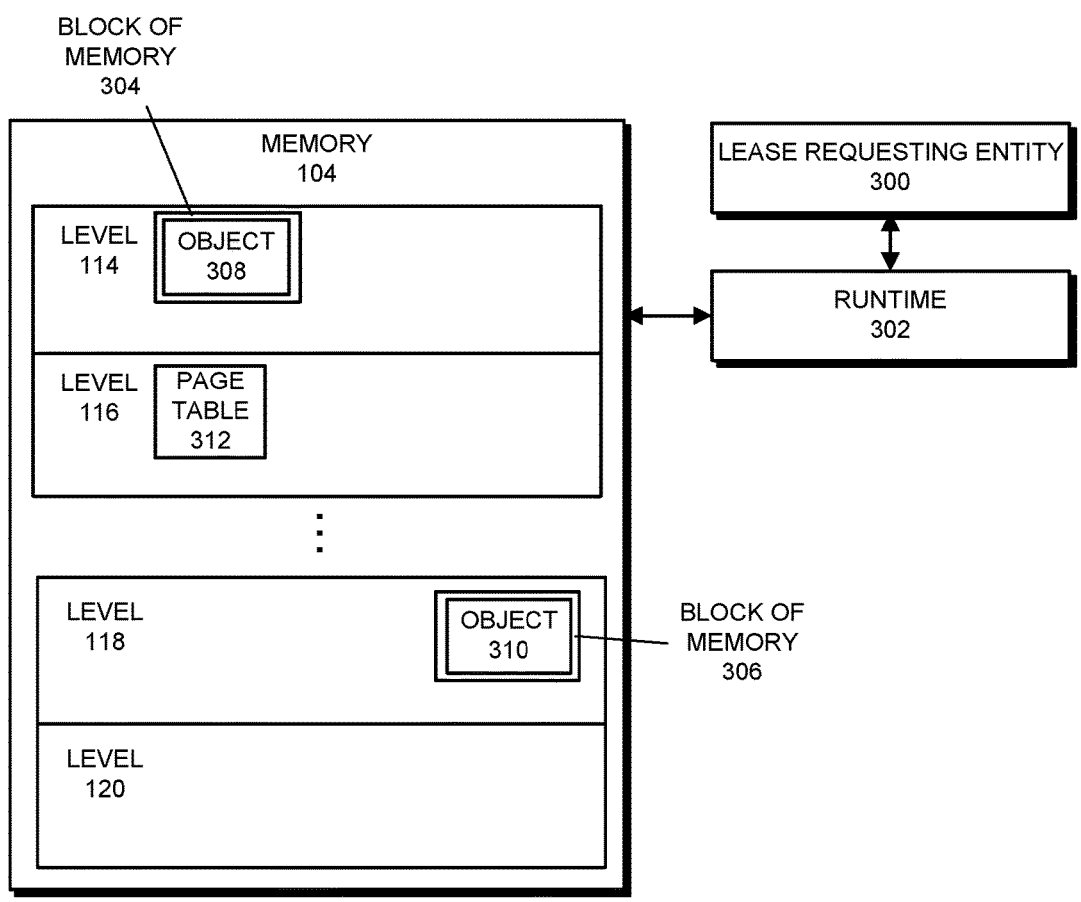
FIG. 3 presents a block diagram illustrating a system for leasing blocks of memory in a multi-level memory hierarchy in accordance with some embodiments.

FIG. 3 presents a block diagram illustrating a system for leasing blocks of memory in a multi-level memory hierarchy in accordance with some embodiments. Note that the system shown in FIG. 3 is presented as a general example of a system in some embodiments. Other embodiments include a differently-arranged system, perform different operations, and/or perform operations in a different order. Also, although certain mechanisms, entities, and objects are used in describing the system (e.g., runtime 302, blocks of memory 304-306, objects 308-310, etc.), in some embodiments, other mechanisms and entities perform the operations and/or are used when performing the operations.

Lease requesting entity 300 is an entity that requests a lease for a block of memory (e.g., blocks of memory 304-306) for storing an object (e.g., objects 308-310) in a specified level of memory 104 (i.e., in the multi-level memory hierarchy). Lease requesting entity 300 may be a hardware entity, a software entity, or some combination thereof. For example, lease requesting entity 300 may be, or include, a hardware entity such as a controller (e.g., memory management unit 112, a system component, etc.), a hardware accelerator, a processor core (e.g., one of processor cores 106-110), an embedded processor, a peripheral device, etc. A hardware entity may execute program code (e.g., software applications, firmware, etc.) or perform circuit operations that cause the hardware entity to request leases for blocks of memory for storing objects. As another example, lease requesting entity 300 may be, or include, software entity such as an operating system, a device driver, a software program, etc. executed by computing device 100 (e.g., by one of cores 106-110). A software entity can include program code that causes the software entity, when executed by a processor or other hardware entity, to request leases for blocks of memory for storing objects. In some embodiments, lease requesting entity 300 is a portion of runtime 302 (e.g., a subroutine or functional block within runtime 302).

Runtime 302 performs, possibly among other operations, operations for leasing blocks of memory for storing objects in memory 104. Runtime 302 may be a hardware entity, a software entity, or some combination thereof. For example, runtime 302 may be, or include, a hardware entity such as a controller (e.g., memory management unit 112, a system component, etc.), a hardware accelerator, a processor core (e.g., one of processor cores 106-110), an embedded processor, a peripheral device, etc. As another example, runtime 302 may be, or include, software entity such as an operating system, a device driver, a software program executed by computing device 100 (e.g., by processor 102), etc.

Objects 308-310 (e.g., 4 KB pages of data) are stored in blocks of memory 304-306, respectively. As described herein, blocks of memory 304-306 may be leased, in which case objects 308-310 are kept in the block of memory until the lease is terminated.

Page table 312 is a record (e.g., list, table, directory, etc.) that includes an entry, or a page table entry, with virtual address to physical address translation information for pages of data that are stored in memory 104. As is known in the art, programs access memory using virtual addresses, and memory management unit 112 (or another entity) translates the virtual addresses used by programs into physical addresses in memory 104 where corresponding data is located. In some embodiments, each time that a program accesses memory (using a virtual address), memory management unit 112 performs a lookup in page table 312 (or in a translation lookaside buffer (TLB), in which information from page table entries is cached) to acquire the corresponding physical address.

In some embodiments, page table entries in page table 312 include a lease indicator (e.g., one or more bits) that can be set to a specified value (e.g., to "1," etc.) to indicate that a block of memory in which the corresponding page of data is stored is leased. The lease indicators in page table entries may be used for determining whether a lease is held for a given block of memory, how many total blocks of memory are leased in memory 104, levels in memory 104 in which leased blocks are present, etc. In some embodiments, the lease indicators can be acquired during the above-described lookup in page table 312. In other words, an existing lookup in page table 312 for translation information can be augmented to include acquiring lease indicator(s).

Although lease indicators are described above as being held in page table entries, in some embodiments, lease indicators (or equivalent information) are held elsewhere in computing device 100. For example, in some embodiments, computing device 100 includes a lease record functional block (e.g., register file, memory structure, etc.) in which information identifying blocks of memory that have been leased is stored. For instance, in some embodiments, the lease record functional block includes a set of lease records that identify blocks of memory that are currently leased (e.g., by starting address and size). In some embodiments, the lease record functional block is a quick-access hardware mechanism configured to be rapidly checked for information by runtime 302. As another example, in some embodiments, a software lease data structure other than the page table, such as a table, record, list, variable, etc. is used for storing lease indicators (or equivalent information) in a local cache or memory element in runtime 302 or in memory 104.

In some embodiments, the page table, lease record functional block, and/or software lease data structure include lease summary information such as total blocks presently leased in memory 104, blocks presently leased in one or more levels, rate of lease requests rejected, etc. In these embodiments, the summary information may be used alone or in combination with the lease indicators to determine the current leased state of memory 104.

In some embodiments, objects themselves include or are otherwise associated with an indication that a leased block of memory should be used to store the object. For example, in some embodiments, certain types and/or classifications of objects are associated with a general indication that a leased block of memory should be used for storing the objects in specified levels of memory 104. For instance, objects created within a particular portion of program code, objects of a given variable type, objects of a specified size, objects created by or used by a given hardware or software entity, and/or other object classifications may be used to determine if the object should be stored in a leased block of memory. As another example, in some embodiments, particular instances of objects are associated with metadata (e.g., attributes, etc.) that indicate that leased blocks of memory should be used for storing the objects in given levels of memory 104. In some embodiments, the indications for objects are specified by a developer (e.g., in program code), a compiler, a software program (code optimizer, etc.), etc., as program code for a software program that creates objects is being developed or updated (written, compiled, optimized, patched, etc.). In these embodiments, the attributes may be incorporated in binaries that include the objects, executable program code for software programs, etc.

In some embodiments, lease requesting entity 300 (or another entity) may dynamically (i.e., at runtime of computing device 100) determine whether blocks of memory are to be leased for storing corresponding objects. For example, lease requesting entity 300 may monitor properties of one or more objects, such as the past, present, and/or projected future accesses of the one or more objects, the nature of the one or more objects (e.g., size, composition, age, etc.), etc. and determine whether blocks of memory are to be leased for one or more objects (which may or may not include the monitored one or more objects) based on the properties of the monitored one or more objects. As another example, lease requesting entity 300 may monitor properties of one or more levels of memory 104, such as a total number of leased blocks in the one or more levels, the total number of objects in the one or more levels, space/blocks available in the one or more levels, number of lease requests rejected, access times, etc., and determine whether blocks of memory are to be leased for one or more objects based on the properties of the one or more levels of memory 104. As yet another example, lease requesting entity 300 may monitor properties of computing device 100, such as an operating mode of computing device 100, an amount of communication traffic on communication buses, a thermal or power use pattern within computing device 100, etc., and determine whether blocks of memory are to be leased for one or more objects based on the properties of computing device 100. As yet another example, lease requesting entity 300 may monitor an application phase (e.g., a memory access intensive phase, a computational phase in which few memory accesses are performed, etc.) of an application by which one or more objects are being or are to be accessed. In some embodiments, a combination of the above-described conditions may be used to dynamically determine whether blocks of memory are to be leased for storing objects.

Process for Leasing Blocks of Memory

Figure 4:
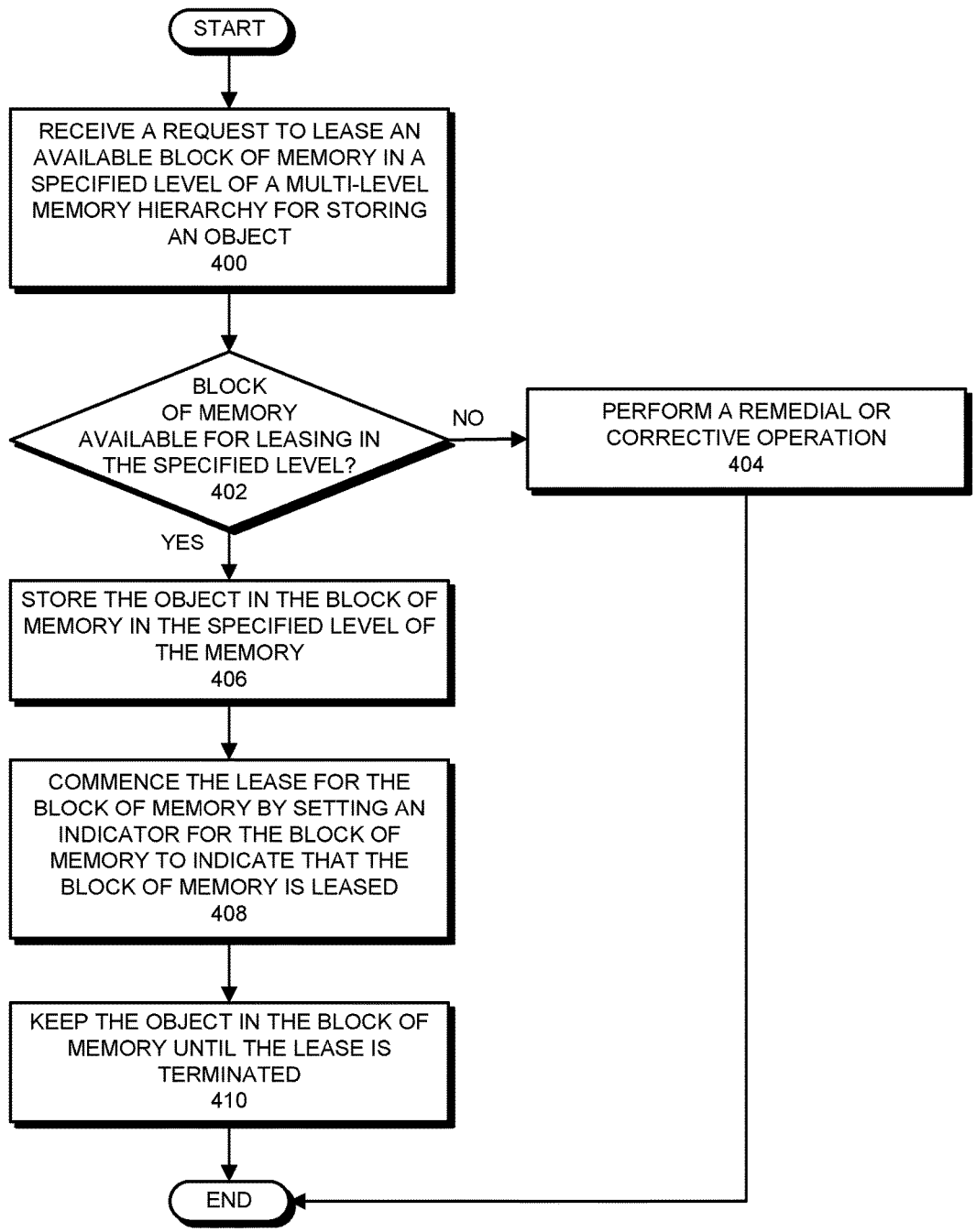
FIG. 4 presents a flowchart illustrating a process for leasing blocks of memory in a multi-level memory hierarchy in accordance with some embodiments.

FIG. 4 presents a flowchart illustrating a process for leasing blocks of memory in a multi-level memory hierarchy in accordance with some embodiments. The operations shown in FIG. 4 are presented as a general example of operations performed by some embodiments. The operations performed by other embodiments include different operations and/or operations that are performed in a different order. For example, although FIG. 4 shows steps 406 and 408 in a particular order, in some embodiments, steps 406 and 408 are reversed, so that the lease is commenced before the object is stored in the leased block of memory. Additionally, although certain mechanisms and entities are used in describing the operations (e.g., runtime 302, etc.), in some embodiments, other mechanisms and entities may perform the operations.

As shown in FIG. 4, the process starts when runtime 302 receives, from lease requesting entity 300, a request to lease an available block of memory in a specified level of a multi-level memory hierarchy for storing an object (step 400). For example, lease requesting entity 300 may determine, based on attributes associated with an object, one or more runtime conditions, and/or other characteristics of the object, memory 104, etc. that the object is to be stored, if possible, in a leased block of memory in the specified level. Lease requesting entity 300 also determines the specified level, which may be a particular level (e.g., level 114) or a general identification of a type of memory (e.g., stacked DRAM, DRAM, flash, etc.) from which a particular level may be determined. For example, in the request, lease requesting entity 300 may generally indicate that the block of memory is to be leased in a stacked DRAM module, in an embodiment in which separate DRAM modules are included two or more of levels 114-116. Lease requesting entity 300 then communicates a corresponding request to runtime 302.

In some embodiments, runtime 302 is a software entity that provides an application programming interface (API) that enables lease requesting entity 300 to send the above-described request using an API call in a format such as lease_start(data_obj, mem_level). In these embodiments, the data_obj parameter includes an indicator of the data object to be stored in the leased block of memory (e.g., a pointer, reference, descriptor, address, etc.). From the data_obj parameter, runtime 302 can directly or indirectly determine a size of the data object (assuming that data objects are not of a fixed size), a location of the data object, a type of the data object, and/or other properties of the data object. For example, in some embodiments, data_obj is a pointer to a page or range of pages of data to be stored in memory 104, each page being a specified size (e.g., 4 KB). The mem_level parameter includes an indicator of the level in memory 104 in which the block of memory is to be leased. For example, the mem_level parameter may include an identification of a particular memory level and/or an identification of a type of memory (stacked DRAM, flash, etc.). In some embodiments, runtime 302 is a hardware entity that enables lease requesting entity 300 to communicate information similar to the above-described API call. For example, runtime 302 may include two or more registers or memory locations to which similar information can be stored and a mechanism such as a signal line on which runtime 302 receives an indicator of the request.

Runtime 302 then determines whether a block of memory is available for leasing in the specified level (step 402). For this operation, runtime 302 determines if a contiguous or non-contiguous block of memory sufficiently large to store the object (e.g., the page or range of pages of data) is available to be leased in the specified level. For example, in some embodiments, runtime 302 checks indicators associated with blocks of memory in the specified level to determine if less than a threshold number of blocks of memory are presently/already leased. In some embodiments, for this operation, runtime 302 acquires (e.g., from lease summary information) or generates a value representing the number of blocks of memory that are presently leased based on a record of existing leases such as lease indicators in a page table (or TLB) or in a lease record functional block. Runtime 302 then compares the acquired value to a threshold value to determine if less than a threshold number of blocks of memory are presently leased. For example, runtime 302 can determine, based on the value and the threshold, if all of the blocks of memory or some portion thereof are presently leased. When less than the threshold number of blocks of memory are presently leased, one or more blocks of memory are determined to be available for leasing in the specified level.

When a block of memory is not available for leasing in the specified level (step 402), runtime 302 performs a remedial or corrective action (step 404). Generally, when performing the remedial or corrective action, runtime 302 performs one or more operations for handling the current inability to lease a block of memory in the specified level (i.e., the lack of available blocks of memory in the specified level). For example, in some embodiments, runtime 302 fails or discards the request, returning a response to lease requesting entity 300 that the request to lease the block of memory was unsuccessful. For instance, when an API is used to communicate the request to runtime 302, runtime 302 may return a value such as 0 or false to lease requesting entity 300 when failing the request. In these embodiments, upon receiving the response indicating the failure, lease requesting entity 300 may retry the request (perhaps after a delay), attempt to lease a block of memory in another level of memory 104, store the object in the specified level without acquiring a lease (i.e., so that the object is stored in the specified level, but not retained as the object would be if a lease was acquired), etc. As another example, in some embodiments, runtime 302 retries the request at least once, possibly after a delay. For example, runtime 302 may add the request to a request retry queue from which the request will eventually be fed out for retrying. When a given number of unsuccessful retries has occurred, runtime 302 may fail or discard the request as described above.

In some embodiments, the remedial or corrective action includes storing as much of the object as possible in a leased block of memory in the specified level and storing the remainder of the object in a different level of memory 104 (or in an unleased portion of memory in the specified level). In other words, runtime 302 leases as much of the block of memory as is available for leasing in the specified level of the memory and stores as much of the object as possible in a leased block of memory. In these embodiments, when a block of memory of a size sufficient to store the entire object is not available for leasing in the specified level of the memory, runtime 302 attempts to lease a smaller portion of memory in the specified level of the memory. For example, when the request is to lease a block of memory for storing two or more 4 KB pages of data (i.e., the object), runtime 302 may determine that there is only one 4 KB block of memory available (i.e., a smaller portion). Runtime 302 then stores part of the object in the smaller portion of memory and stores a remaining part of the object in one or more different levels of the memory and/or in an unleased portion of the specified level of the memory. Continuing the example, above, this would mean that runtime 302 stores one of the two or more 4 KB pages in the smaller portion of the specified level of the memory and stores the remaining 4 KB pages in different level(s) of the memory and/or in an unleased portion of the specified level of the memory. Runtime 302 then sets an indicator for the smaller portion of memory to indicate the smaller portion of memory is leased. In these embodiments, the part of the object is kept in the smaller portion of memory until the lease is terminated, as is done in step 410 for the full object.

When a block of memory is available for leasing in the specified level (step 402), runtime 302 stores the object in the block of memory in the specified level of the memory (step 406). For example, where the object includes one or more pages of data, runtime 302 can retrieve the one or more pages of data from a mass storage device and store the pages of data in the block of memory in the specified level. As another example, runtime 302 can create one or more new blank pages in the block of the memory, the blank pages to be written with data output during computational operations.

Runtime 302 then commences the lease for the block of memory by setting a lease indicator for the block of memory to indicate that the block of memory is leased (step 408). For example, in some embodiments, for this operation, the object is a page of memory and runtime 302 updates a lease indicator in a corresponding entry in a page table to show that the page of memory is stored in a leased block of memory. For instance, runtime 302 can cause a bit in the corresponding entry in the page table to be changed from 0 (representing "not leased") to 1 (representing "leased"). As another example, in some embodiments, runtime 302 updates a lease indicator (e.g., one or more bits, registers, etc.) in a record of existing leases in a lease record functional block and/or software lease data structure to indicate that the block of memory is leased.

In some embodiments, runtime 302 also updates summary information in the page table, the lease record functional block, and/or another quick-access hardware (e.g., register, memory element, etc.) or software (e.g., variable, table, etc.) location to indicate the total number of blocks of memory that have been leased, the total proportion of one or more levels of memory 104 that have been leased, etc. In these embodiments, the summary information can be used to perform step 402 and/or other operations.

Runtime 302 (and other entities) then keep the object in the block of memory until the lease is terminated (step 410). As described above, keeping the object in the leased block of memory includes retaining the object in the leased block of memory under a retention policy such as preventing the object from being evicted, evicting the object only under certain conditions, etc.

Process for Terminating a Lease for a Block of Memory

Figure 5:
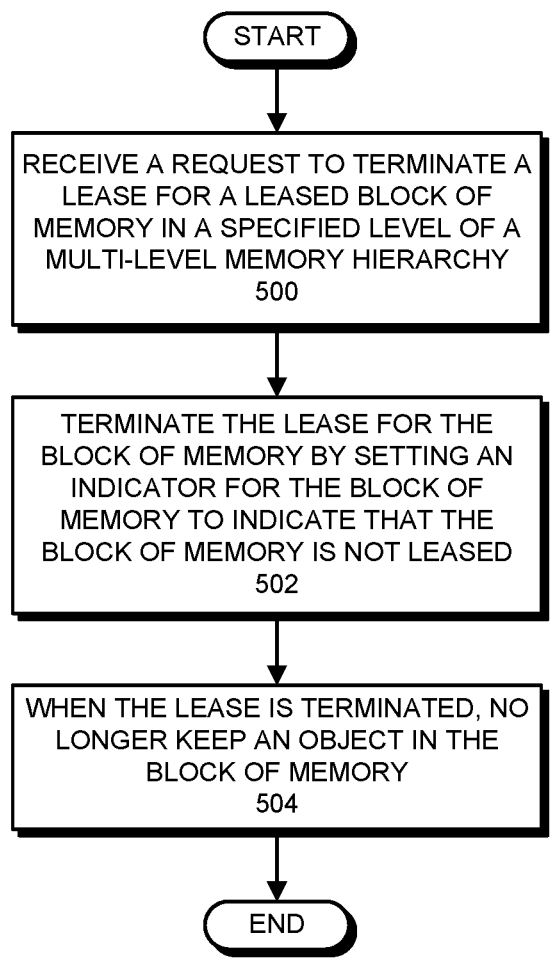
FIG. 5 presents a flowchart illustrating a process for terminating a lease for a block of memory in a multi-level memory hierarchy in accordance with some embodiments.

FIG. 5 presents a flowchart illustrating a process for terminating a lease for a block of memory in a multi-level memory hierarchy in accordance with some embodiments. The operations shown in FIG. 5 are presented as a general example of operations performed by some embodiments. The operations performed by other embodiments include different operations and/or operations that are performed in a different order. Additionally, although certain mechanisms and entities are used in describing the operations (e.g., runtime 302, etc.), in some embodiments, other mechanisms and entities may perform the operations.

For FIG. 5, it is assumed that the operations of FIG. 4 (particularly steps 406-410) have been performed. For this reason, there is a leased block of memory in a specified level of the multi-level memory hierarchy in which an object is stored. In addition, a lease indicator for the block of memory is set to indicate that the block of memory has been leased as described above. Note, however, that, in the event that the lease has not been acquired for the block of memory, upon receiving a request to terminate the (non-existent) lease, runtime 302 can return an error message, cause a fault, or otherwise handle the improper termination request.

As shown in FIG. 5, the process starts when runtime 302 receives, from a hardware or software entity (which may be lease requesting entity 300), a request to terminate a lease for a leased block of memory of in a specified level of a multi-level memory hierarchy (step 500). For example, the hardware or software entity may determine, based on attributes associated with an object or the block of memory, one or more runtime conditions, and/or other characteristics of the object, block of memory, or computing device 100, that the lease for the block of memory is to be terminated. For instance, the hardware or software entity may determine that the object stored in the leased block of memory is no longer to be kept in the specified level of the multi-level memory hierarchy (because an access pattern of the object will be changing, etc.). The hardware or software entity may then communicate a corresponding request to runtime 302.

In embodiments in which runtime 302 is a software entity that provides an API, the API may enable the hardware or software entity to send the above-described request to terminate the lease using an API call in a format such as lease_stop(data_obj, mem_level). In these embodiments, the data_obj parameter includes an indicator of the data object that is stored in the leased block of memory (e.g., a pointer, reference, descriptor, address, etc.). For example, in some embodiments, data_obj is a pointer to a page of data that is stored in the leased block of memory. The mem_level parameter includes an indicator of the level in memory 104 in which the block of memory is leased. For example, the mem_level parameter may include an identification of a particular memory level. In embodiments in which runtime 302 is a hardware entity, runtime 302 may include two or more registers or memory locations to which similar information can be stored and a mechanism such as a signal line on which runtime 302 receives an indicator of the request.

Runtime 302 then terminates the lease for the block of memory by setting an indicator for the block of memory to indicate that the block of memory is not leased (step 502). For example, in some embodiments, for this operation, the object is a page of memory and runtime 302 updates a lease indicator in a corresponding entry in a page table to show that the page of memory is stored in a block of memory that is not leased. For instance, runtime 302 can cause a bit in the corresponding entry in the page table to be changed from 1 (representing "leased") to 0 (representing "not leased"). As another example, in some embodiments, runtime 302 updates a lease indicator (e.g., one or more bits, registers, etc.) in a record of existing leases in a lease record functional block and/or software lease data structure to indicate that the block of memory is not leased.

In some embodiments, runtime 302 also updates summary statistics or values in the page table, the lease record functional block, and/or another quick-access hardware structure (e.g., register, memory element, etc.) or software (e.g., variable, table, etc.) location to indicate the total number of blocks of memory that have been leased, the total proportion of one or more levels of memory 104 that have been leased, etc. In these embodiments, the summary information can be used to perform step 402 and/or other operations.

When the lease has been terminated, runtime 302 (and other entities) no longer keep the object in the block of memory (step 504). For example, runtime 302 (and/or another entity) may immediately remove the object (e.g., evict) from the block of memory and store the object in another level of the multi-level memory hierarchy, in a mass storage device, etc. As another example, runtime 302 may not immediately remove the object from the block of memory (i.e., the object may be left in the block of memory), but the object may become a candidate for removal (and possibly a preferential candidate for removal). In other words, in this case, runtime 302 leaves the object in the block of memory, but stops protecting the object under the retention policy. Thus, the object may be removed from the block of memory when one or more blocks of memory are to be freed for storing other objects (i.e., to make room for new objects to be stored).

Lease Hints

In some embodiments, lease hints can be sent to runtime 302 to indicate leases that are to be started, or are projected to be started, at a future time. In these embodiments, runtime 302 can use information from lease hints to schedule operations, manage blocks of memory, etc. For example, in some embodiments, runtime 302 can keep a record of leases that are to be started and relative start times for the leases, and can use this information to determine whether lease requests are to be failed (such as in steps 402-404). In these embodiments, when runtime 302 determines that sufficient lease hints have been received to indicate future lease requests are forthcoming that will lease all blocks of memory that are available to lease, runtime 302 can determine whether to fail subsequent requests that overlap with the leases indicated in the lease hints (or to eventually fail the hinted-at leases, when the requests are received). As another example, in some embodiments, although the leases have not yet been requested, runtime 302 can store objects into from a specified level of memory—and can subsequently commence leases as described in steps 408-410. As yet another example, in some embodiments, runtime 302 can evict one or more existing objects from the specified level of the memory based on one or more lease hints.

In embodiments in which runtime 302 is a software entity that provides an API, the API may enable the hardware or software entity to send the above-described lease hint using an API call in a format such as lease_hint(data_obj, mem_level, expected_lease_start, expected_lease_termination). In these embodiments, the data_obj parameter includes an indicator of the data object to be stored in a leased block of memory (e.g., a pointer, reference, descriptor, address, etc.). For example, in some embodiments, data_obj is a pointer to a page of data that is to be stored in a leased block of memory. The mem_level parameter includes an indicator of the level in memory 104 in which the block of memory is to be leased. For example, the mem_level parameter may include an identification of a particular memory level and/or an identification of a type of memory (stacked DRAM, flash, etc.). The expected_lease_start and expected_lease_termination are lease start and termination indicators such as absolute times, times relative to a given reference, indicators of events such as instruction counts, cache misses, and/or other events or combinations thereof, etc. at which runtime 302 can expect to receive the above-described lease_start and lease_stop requests. As described above, having the lease start and termination indicators enables runtime 302 to schedule operations, etc. In embodiments in which runtime 302 is a hardware entity, runtime 302 may include registers or memory locations to which similar information can be stored and a mechanism such as a signal line on which runtime 302 receives an indicator of the request.

In some embodiments, as a hardware or software entity begins a set of operation(s), the hardware or software entity sends one or more lease hints to runtime 302 detailing one or more (and possibly all) leases that will be requested by the hardware or software entity during the operation(s). For example, as a software application starts up and/or begins executing a particular method or subroutine, the software application may send a lease_hint to runtime 302 that describes some or all of the leases to be requested during execution of the software application and/or the method or subroutine. As another example, as a hardware entity begins processing data for a given operation, the hardware entity may send a lease hint to runtime 302.

Indicating a Lease Termination in a Lease Request

In some embodiments, the above-described lease_start request includes a lease terminate parameter. For example, the API call may have a format such as lease start(data_obj, mem_level, lease terminate). In these embodiments, the lease terminate parameter is a termination indicator such as an absolute time, a time relative to a given reference, an indicator of an event such as an instruction count, a number of cache misses, and/or other events or combinations thereof at which the lease for the block of memory is to be terminated. Upon receiving such a lease_start request, runtime 302 establishes a lease for a block of memory for as described above for FIG. 4. Differently than the embodiment described in FIG. 5, however, runtime 302 automatically terminates the lease for the block of memory at the time, event, etc. indicated by the lease terminate parameter—without receiving a lease_stop request. In this way, a requesting hardware or software entity can, when a lease termination time, event, etc. is known or can be estimated, avoid sending a separate lease_stop request.

In some embodiments, a computing device (e.g., computing device 100 in FIG. 1 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, NVRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules (or hardware entities) are configured to perform the operations herein described. For example, the hardware modules can include, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a non-transitory computer-readable storage medium that includes a database or other data structure which can be read by a computing device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for handling data in a computing device having two or more levels of memory, the method comprising:
    receiving a lease hint that indicates that a lease may subsequently be requested for a block of memory, the lease hint comprising a first indication of an object, a second indication of a specified level of memory, and an expected lease timing;
    based on at least some of the first and second indications and the expected lease timing, controlling the performance of one or more operations affecting at least one of the object or other objects associated with the block of memory;
    receiving a request to lease an available block of memory in the specified level of memory for storing the object;
    when a block of memory is available for leasing in the specified level of memory, storing the object in the block of memory; and
    commencing the lease for the block of memory by setting, to a value that identifies the block of memory as being leased, a lease indicator associated with the block of memory from among two or more lease indicators associated with respective blocks of memory in the specified level of memory, wherein the object is kept in the block of memory until the lease is terminated.

2. The method of claim 1, further comprising:
    receiving a request to terminate the lease for the block of memory; and
    terminating the lease, the terminating comprising setting the indicator for the block of memory to indicate that the block of memory is not leased, wherein the object is no longer kept in the block of memory when the lease is terminated.

3. The method of claim 2, wherein, when the object is no longer kept in the block of memory when the lease is terminated, the object is retained in the block of memory, but the object is made a candidate for eviction from the specified level of memory.

4. The method of claim 2, wherein, when the object is no longer kept in the block of memory when the lease is terminated, the object is immediately evicted from the specified level of memory.

5. The method of claim 1, further comprising:
receiving, with the request to lease the available block of memory, a termination indicator for the lease; and
when a condition associated with the termination indicator for the lease occurs, terminating the lease, the terminating comprising setting the indicator for the block of memory to indicate that the block of memory is not leased, wherein the object is no longer kept in the block of memory when the lease is terminated.

6. The method of claim 1, further comprising:
preventing eviction of the object from the block of memory when the indicator for the block of memory indicates that the block of memory is leased.

7. The method of claim 1, further comprising, after receiving an additional request to lease an available block of memory:
when there are no blocks of memory available for leasing in the specified level of memory, failing the additional request without commencing a lease for a block of memory.

8. The method of claim 1, further comprising, after receiving an additional request to lease an available block of memory:
when there are currently no blocks of memory available for leasing in the specified level of memory, retrying the additional request at least once after a corresponding delay time.

9. The method of claim 1, further comprising, after receiving an additional request to lease an available block of memory:
when there are no blocks of memory available for leasing in the specified level of memory, but a smaller portion of memory is available for leasing in the specified level of memory, storing part of the object into the smaller portion of memory, wherein the smaller portion of memory is smaller in capacity than the block of memory, and wherein a remaining part of the object is stored elsewhere in the two or more levels of memory; and
setting an indicator for the smaller portion of memory to indicate the smaller portion of memory is leased, wherein the part of the object is kept in the smaller portion of memory until the lease is terminated.

10. The method of claim 1, wherein the controlling comprises:
scheduling an eviction of other objects from the specified level of memory.

11. A computing device, comprising:
a processor; and
two or more levels of memory;
wherein the computing device is configured to:
receive a lease hint that indicates that a lease may subsequently be requested for a block of memory, the lease hint comprising a first indication of an object, a second indication of a specified level of memory, and an expected lease timing;
based on at least some of the first and second indications and the expected lease timing, control the performance of one or more operations affecting at least one of the object or other objects associated with the block of memory;
receive a request to lease an available block of memory in the specified level of memory for storing the object;
when a block of memory is available for leasing in the specified level of memory, store the object in the block of memory in the specified level of memory; and
commence the lease for the block of memory by setting, to a value that identifies the block of memory as being leased, a lease indicator associated with the block of memory from among two or more lease indicators associated with respective blocks of memory in the specified level of memory, wherein the object is kept in the block of memory until the lease is terminated.

12. The computing device of claim 11, wherein the computing device is further configured to:
receive a request to terminate the lease for the block of memory; and
terminate the lease, the terminating comprising setting the indicator for the block of memory to indicate that the block of memory is not leased, wherein the object is no longer kept in the block of memory when the lease is terminated.

13. The computing device of claim 12, wherein, when the object is no longer kept in the block of memory when the lease is terminated, the object is retained in the block of memory, but the object is made a candidate for eviction from the specified level of memory.

14. The computing device of claim 12, wherein, when the object is no longer kept in the block of memory when the lease is terminated, the object is immediately evicted from the specified level of memory.

15. The computing device of claim 11, wherein the computing device is further configured to:
receive, with the request to lease the available block of memory, a termination indicator for the lease; and
when a condition associated with the termination indicator for the lease occurs, terminate the lease, the terminating comprising setting the indicator for the block of memory to indicate that the block of memory is not leased, wherein the object is no longer kept in the block of memory when the lease is terminated.

16. The computing device of claim 11, wherein the computing device is further configured to:
prevent eviction of the object from the block of memory when the indicator for the block of memory indicates that the block of memory is leased.

17. The computing device of claim 11, wherein the computing device is further configured to, after receiving an additional request to lease an available block of memory:
when there are currently no blocks of memory available for leasing in the specified level of memory, one of: fail the additional request without commencing a lease for a block of memory; or retry the additional request at least once after a corresponding delay time.

18. The computing device of claim 11, wherein the computing device is further configured to, after receiving an additional request to lease an available block of memory:
when there are no blocks of memory available for leasing in the specified level of memory, but a smaller portion of memory is available for leasing in the specified level of memory, store part of the object into the smaller portion of memory, wherein the smaller portion of memory is smaller in capacity than the block of memory, and wherein a remaining part of the object is stored elsewhere in the two or more levels of memory; and set an indicator for the smaller portion of memory to indicate the smaller portion of memory is leased, wherein the part of the object is kept in the smaller portion of memory until the lease is terminated.

\* \* \* \* \*